United States Patent [19]

Olschewski et al.

[11] 4,311,348
[45] Jan. 19, 1982

[54] LINEAR MOTION BALL BEARINGS

[75] Inventors: Armin Olschewski, Schweinfurt; Manfred Brandenstein, Eussenheim; Lothar Walter, Schweinfurt; Horst M. Ernst, Eltingshausen; Friedrich Schido, Heusweiler, all of Fed. Rep. of Germany

[73] Assignee: SKF Kugellagerfabriken GmbH, Schweinfurt, Fed. Rep. of Germany

[21] Appl. No.: 55,056

[22] Filed: Jul. 5, 1979

[30] Foreign Application Priority Data

Jul. 11, 1978 [DE] Fed. Rep. of Germany ....... 2830400

[51] Int. Cl.³ .................. F16C 29/06; B21D 53/10
[52] U.S. Cl. .................. 308/6 C; 29/148.4 R; 29/149.5 R
[58] Field of Search .................. 308/4 R, 6 C; 29/148.4 R, 149.5 R, 149.5 C

[56] References Cited

U.S. PATENT DOCUMENTS

| 2,509,749 | 5/1950 | Thomson | 308/6 R |
| 2,855,252 | 10/1958 | Budinger et al. | 308/237 R |
| 3,070,405 | 12/1962 | Hülck et al. | 308/6 C |
| 3,565,494 | 2/1971 | Linz et al. | 308/6 R |
| 3,887,246 | 6/1975 | McCloskey | 308/6 C |
| 4,123,121 | 10/1978 | Ernst et al. | 308/6 C |
| 4,139,242 | 2/1979 | Ernst et al. | 308/6 C |

FOREIGN PATENT DOCUMENTS

| 1675057 | 12/1970 | Fed. Rep. of Germany | 308/6 C |
| 863497 | 3/1961 | United Kingdom | 308/6 C |
| 1128007 | 9/1968 | United Kingdom | |

Primary Examiner—Richard R. Stearns
Attorney, Agent, or Firm—Daniel M. Rosen

[57] ABSTRACT

A linear motion ball bearing has an outer sleeve formed from a flat blank rolled into a circular split-sleeve, a cylindrical cage situated within the bore of the outer sleeve and defining therewith continuous ball races filled with a plurality of balls, the axial gap and bore diameter of the outer sleeve being variable to provide adjustment of the bearing.

11 Claims, 5 Drawing Figures

LINEAR MOTION BALL BEARINGS

BACKGROUND OF THE INVENTION

The present invention relates to a ball bearing for the longitudinal mounting of machine parts, consisting of an outer race sleeve made from a flat plate and rolled into a cylindrical tube having ball races provided in its bore and a cage disposed concentrically therein for the guidance of a plurality of continuous trains of balls distributed over the circumference.

DESCRIPTION OF THE PRIOR ART

Ball bearings of the kind described above having a race sleeve made from a flat plate and rolled into a cylindrical tube are already known. In one known embodiment, the outer race sleeve remains open at the seam to enable the sleeve bore diameter of the ball bearing to vary within certain limits as disclosed in German Pat. No. 1,069,432. Also known is a method for making an outer race sleeve for a ball bearing, mounted for longitudinal movement, in which the race sleeve is made from flat material into which the ball races are embossed by compression of the material, and which is then rolled to form the cylindrical sleeve or tube. In this method the race sleeve can remain unattached at the seam or can be welded if desired, as disclosed in German Auslegeschrift 1,675,057.

These known open constructions do not permit any precise adjustment of the sleeve bore diameter. If the bearing seat is not precisely made, the seam may open too wide, thereby, either (a) affecting the geometry of the bearing and thus resulting in an unequal load distribution, or (b) giving too much play of the shaft with respect to the bearing which thus runs noisily and imprecisely. The balls are already under high pressure even without external loading; if the seam is not open wide enough, it will bind the balls too tightly, increase friction and adversely affect ease of rolling of these balls. These open constructions have the additional disadvantage that after the hardening operation following the rolling operation, a distortion of the outer race sleeve takes place, and the gaps or open seams interfere with installation in a bore in the casing of a machine.

In known closed-seam designs, an additional welding operation is required, which on the one hand is difficult and expensive, and on the other hand can result in a change of shape and dimensions. Such closed-seam designs have the additional disadvantage that no adjustment can be made of the sleeve bore diameter and no resilient deformation is possible.

SUMMARY OF THE INVENTION

The invention disclosed herein is addressed to the objective of creating a ball bearing of the kind mentioned above, but where the outer race sleeve has the advantages of the simple and economical manufacture of a race sleeve from flat plate. With this invention the race sleeve preserves the desired shape after the rolling operation and during the hardening operation, and also permits a precise adjustment of the sleeve bore diameter.

The advantages achieved by the invention are to be seen substantially in the fact that the outer race sleeve has a simple interlocked seam after it has been rolled. This permits movement within given limits, so that the danger of distortion during the subsequent hardening operation is avoided. The configuration of the interlocking elements furthermore permits the adjustment of the circular sleeve housing within certain limits. The abutting surfaces on the one hand prevent the outer race sleeve from expanding excessively upon installation and in operation, but on the other hand also prevent it from being excessively constricted.

A preferred embodiment of the invention will now be described with reference to the drawings appended hereto.

DETAILED DESCRIPTION OF THE PREFERRED EMBODIMENT

Figure 1:
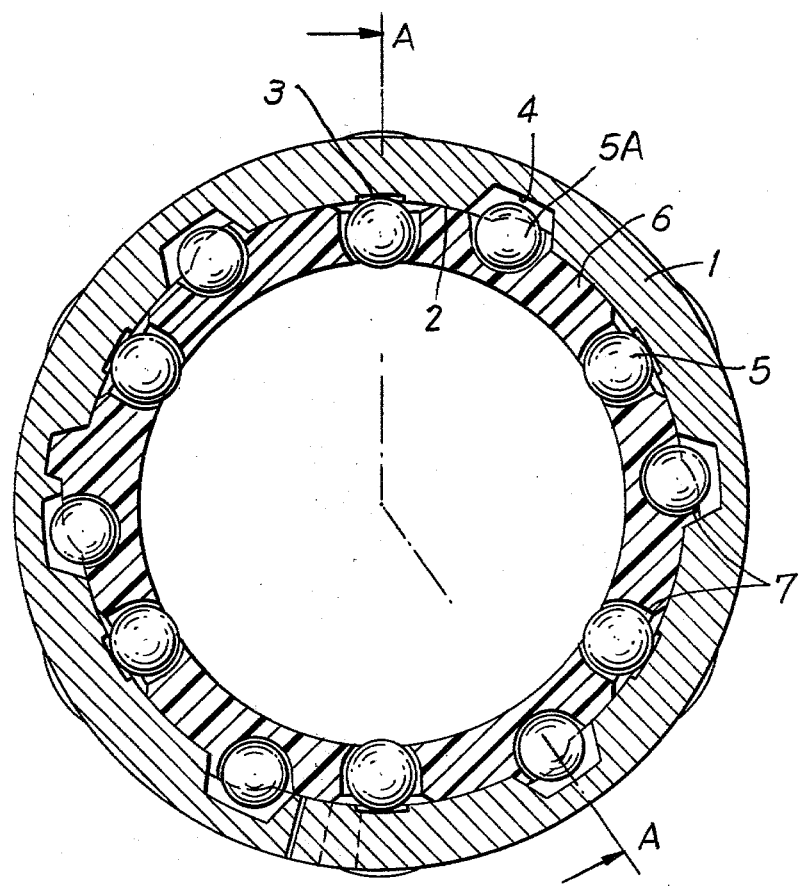
FIG. 1 is a cross-sectional view of a linear motion ball bearing.
Figure 2:
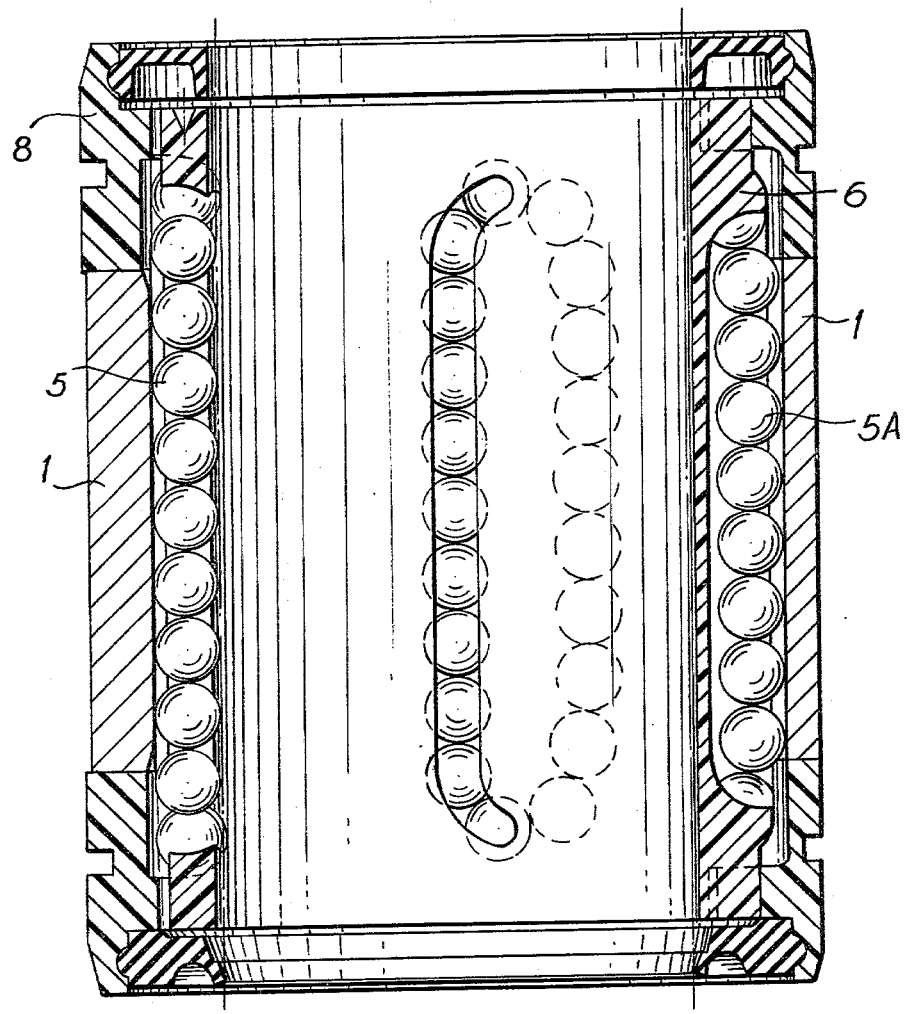
FIG. 2 is a longitudinal cross-sectional view taken along line A—A of FIG. 1.
Figure 3:
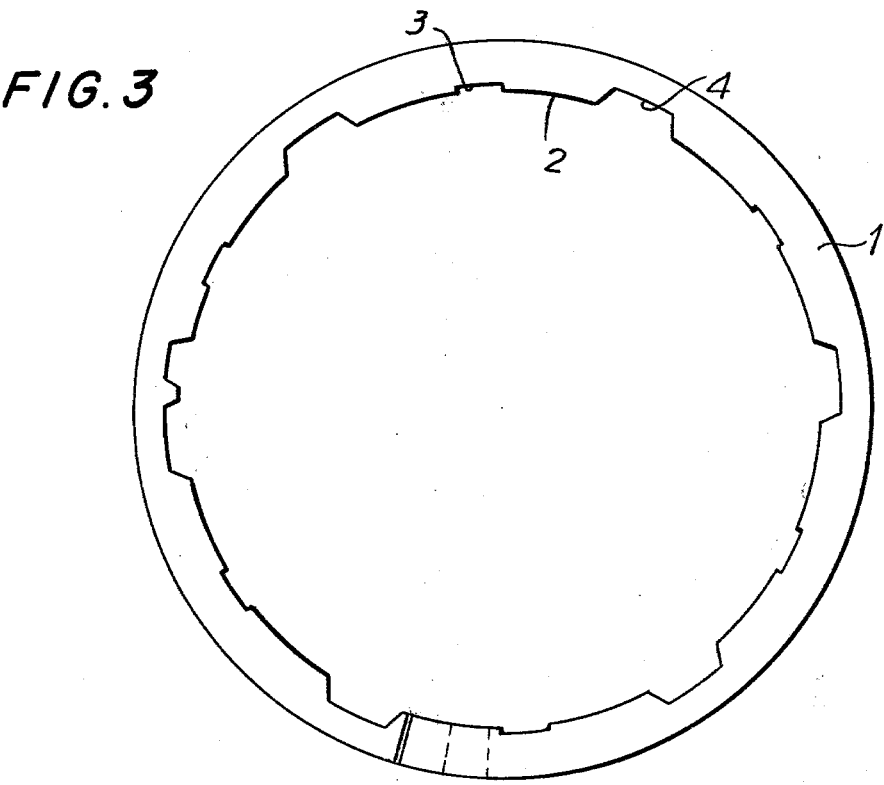
FIG. 3 is a side elevation view of the race sleeve of the ball bearing of FIGS. 1 and 2 after rolling to the cylindrical shape.

The linear motion ball bearing in accordance with FIGS. 1 and 2 includes the outer race sleeve 1 which has within its bore 2 the ball races 3 for the load-carrying balls 5 and ball races 4 for the non-load-carrying balls 5A, the balls being disposed as continuous trains. The cage 6 inserted into the bore includes continuous grooves 7 for the guidance of a plurality of continuous trains of balls 5, the grooves 7 being distributed about the circumference. Lastly, the end rings 8 are situated on the ends of cage 6 and extend beyond the outer race sleeve 1, these end rings covering the semicircular return sections of the continuous grooves 7 guiding the balls 5.

Figure 4:
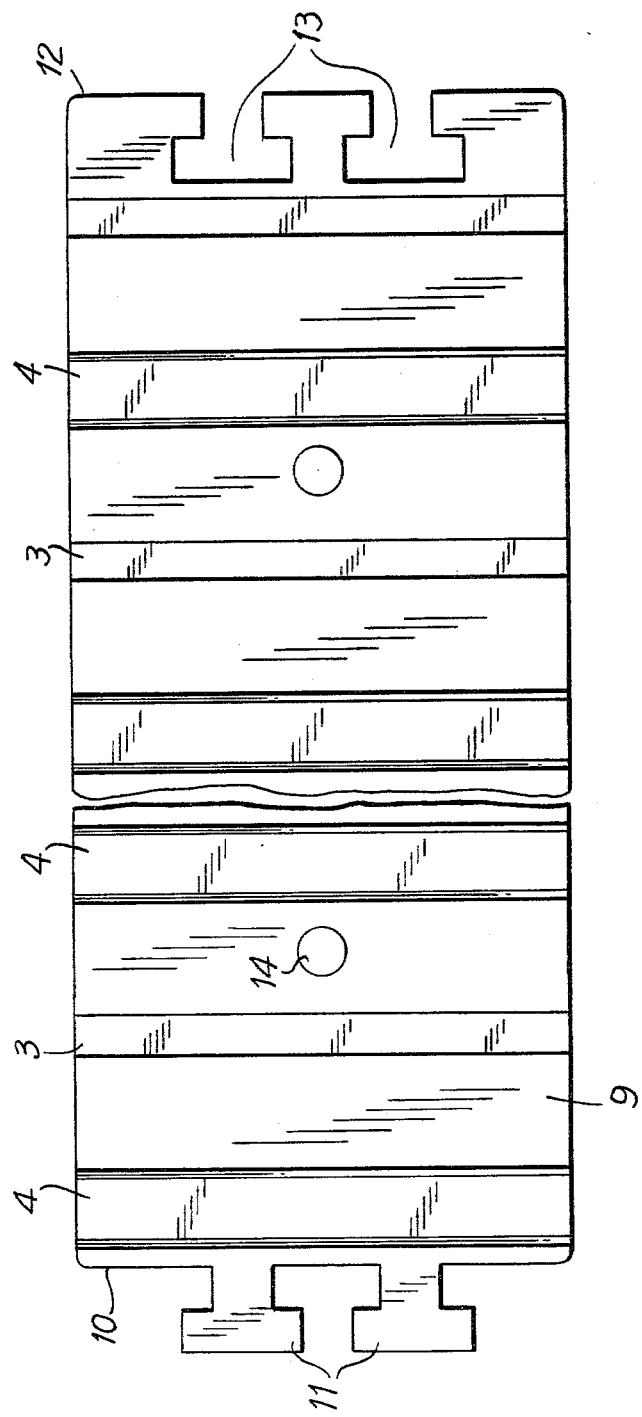
FIG. 4 is a plan view of the outer race sleeve of FIG. 3 in the flat state.

The outer race sleeve, which in the present embodiment has only the axially disposed portions of the races 3 for the load-carrying and the races 4 for the non-load-carrying balls 5, is made, as best seen in FIG. 4, from a flat plate 9. In this plate 9 the races 3 for the load-carrying balls and races 4 for the non-load-carrying balls are created in an appropriate manner by cutting or non-cutting methods. At one end 10, T-shaped tabs 11 projecting longitudinally are provided; at the opposite end 12 correspondingly T-shaped cutouts 13 are provided. For greater ease of relubrication, oil holes 14 can be provided between the pairs of races 3 and 4 of the individual continuous trains of balls. The plate 9 thus prepared is then by an appropriate method, rolled to the cylindrical shape, and the tabs 11 are engaged in the corresponding cutouts 13, thus crossing the seam line.

Figure 5:
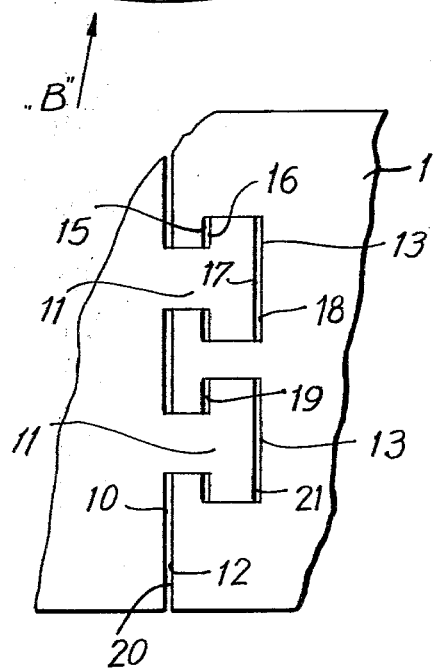
FIG. 5 is a fragmentary plan view of the seam area of the outer race of FIG. 3, as seen in the direction of the arrow B.

It can be seen in FIG. 5 that the dimensions of the undercut surfaces 15 of the cutouts 13 and of the undercut surfaces 16 of the tabs 11, and the abutting edges 10 and 12 and the terminal edges 17 of the tabs 11 and the back edges 18 of the cutouts 13, are so selected to form gaps 19, 20 and 21 between the above-defined pairs of adjacent surfaces and edges. This will enable the outer race sleeve to flex to a certain extent, the abutting edges 10 and 12 preventing any further constriction of the outer race sleeve 1, and the undercut surfaces 15 and 16 preventing any further expansion of the outer race sleeve, this tab and cutout connection means thus establishing predetermined limits of expansion and constriction of said sleeve.

The invention is not restricted to the embodiment described above. Thus, modifications or changes are possible in the construction of the ball bearing. For example, the outer race sleeve 1 can extend over the entire length of the bearing, i.e., it can envelop also the semicircular return sections of the continuous ball races disposed at the ends of the axially disposed sections of the races. Neither is the construction of the interlocking elements restricted to the illustrated form; instead of the T-shaped construction of the tabs and cutouts, other forms are, of course, possible, such as dovetail-like shapes. These and other modifications are possible without departing from the spirit and scope of this invention as set forth in the claims appended hereto.

What is claimed is:

1. In a linear motion ball bearing including an outer race sleeve formed from a flat plate having opposite ends, the plate bent to form a cylindrical split-sleeve tube having length in the axial direction and defining a bore, with said opposite ends being adjacent and circumferentially spaced thereby defining a gap that extends generally lengthwise and circumferentially, a cage disposed in said bore and defining therewith continuous ball raceways distributed circumferentially with a plurality of balls disposed in said raceways, the improvement comprising connection means interconnecting one of said adjacent ends with the other of said ends for permitting limited relative movement of these ends and correspondingly limited variation of said gap in the circumferential direction, and correspondingly limited variation of the bore diameter of said outer race sleeve.

2. A ball bearing according to claim 1 wherein said connection means comprises at least one projection extending generally circumferentially from one of said adjacent ends to and lockingly engaging the other of said ends.

3. A ball bearing according to claim 2 wherein said projection has a predetermined shape, and said connection means further comprises a cutout having shape corresponding to said projection shape, said projection being situated in said cutout for locking engagement therewith.

4. A ball bearing according to claim 2 wherein said projection has at least one generally T-shape configuration with the stem of the T extending circumferentially from one of said ends and the cross of the T being spaced from said end, and said connection means further comprises at least one cutout having a corresponding T-shape in which said projection is situated, said projection end cutout being relatively dimensioned for permitting said limited increase and decrease of said gap in the circumferential direction.

5. A ball bearing according to claim 2 wherein said connection means comprises a plurality of projections and corresponding cutouts spaced apart in the axial direction.

6. A ball bearing according to claim 1 wherein the portions of said raceways defined by said bore of said outer race sleeve are machined surfaces.

7. In a linear motion ball bearing including an outer race sleeve comprising a cylindrical wall formed as a split-sleeve tube having length in the axial direction and defining a bore, said wall also including therein a gap extending generally lengthwise and defined by adjacent and circumferentially-shaped edges of said wall, a cage disposed in said bore and defining therewith continuous ball raceways distributed circumferentially with a plurality of balls disposed in said raceways, the improvement comprising connection means interconnecting one of said adjacent edges with the other of said edges for permitting relative movement of these edges and correspondingly limited variation of said gap in the circumferential direction, and correspondingly limited variation of the bore diameter of said outer race sleeve.

8. In a method of making an outer race sleeve for a linear motion ball bearing, the improvement comprising the steps of forming a flat plate having opposite ends, rolling said plate into a split-sleeve cylindrical shape with said ends being positioned adjacently and circumferentially spaced, and interconnecting said ends in locking engagement which permits limited relative movement therebetween in said circumferential direction.

9. A method according to claim 8 comprising the further steps of forming on one of said ends while said plate is in a flat condition a projection of predetermined shape and extending in the direction of said end, forming in said other end a cutout having shape corresponding to that of said projection, and lockingly disposing said projection in said cutout when said plate is rolled into said split-sleeve cylindrical shape.

10. An outer race for a rolling bearing, comprising a flat plate having opposite ends, said plate being curved to form a split sleeve, the inside of said plate including a plurality of raceways formed directly on said plate to accommodate rolling elements, said opposite ends having respective mating linking means adapted to be linked together to complete said sleeve, said linking means comprising a mechanical interconnection having a limited circumferential play.

11. A linear motion ball bearing including an outer race sleeve, comprising a flat plate having opposite ends, the plate bent to form a cylindrical split-sleeve tube having length in the axial direction and defining a bore, with said opposite ends being adjacent and circumferentially spaced from one another and respectively provided with complementary interlocking means extending generally lengthwise and circumferentially from said plate ends, said plate defining thereon continuous ball raceways distributed circumferentially for accommodating a plurality of balls disposed in said raceways, said complementary interlocking means nestable within one another and interconnecting one of said adjacent ends with the other of said ends, wherein said interlocking means allows movement of one of said ends, relative to the other, thereby establishing limits of expansion and constriction of said sleeve.

* * * * *